July 23, 1940.  J. C. CROWLEY  2,208,961

VALVE STEM

Filed March 31, 1937

INVENTOR.
JOHN C. CROWLEY
BY Kwis Hudson & Kent
ATTORNEYS

Patented July 23, 1940

2,208,961

UNITED STATES PATENT OFFICE 2,208,961

VALVE STEM

John C. Crowley, Cleveland Heights, Ohio, assignor to The Dill Manufacturing Company, Cleveland, Ohio, a corporation of Ohio Application March 31, 1937, Serial No. 134,029

4 Claims. (Cl. 277—42)

This invention relates to a valve stem such as is used with a tire tube or other inflatable rubber article, and particularly relates to an improved means for closing the upper end of the stem.

It has been usual to provide valve stems with caps or closure members for the upper ends of the stems. These caps have been constructed in the form of detachable members which are screwed down into position exteriorly upon the reduced threaded nipples of the valve stems. Some of these caps have been so constructed that they must be removed before the articles to which the stems are attached can be inflated or deflated, or before an air gauge can be applied to the stems to take a reading of the air pressures in the tubes or articles. Other of these caps while screwed exteriorly upon the reduced threaded nipples of the stems are provided with spring-pressed elements which normally close a passage through the caps and which can be depressed into engagement with the heads of the valve pins to unseat the valves for purposes of inflation or deflation or the taking of pressure readings without removing the caps from the stems.

An object of the present invention is to provide an improved means for closing the upper end of a valve stem, and wherein said means does not interfere with the unseating of the valve in the stem for purposes of inflation, deflation or the taking of pressure readings.

Another object is to provide closure means for the upper end of a valve stem, as specified in the object just above set forth, and wherein it is not necessary to provide a cap that screws exteriorly upon the reduced threaded nipple of the valve stem or to provide springs for holding the closure member in normally closed position.

Another object is to provide closure means for the upper end of a valve stem which does not increase the length of the stem.

A further object is to provide a closure member for the upper end of a valve stem, which member is arranged within the valve stem.

Another object is to provide means arranged within the outer end of a valve stem itself for closing the same and which is of such character as not to interfere with the mounting in or the removal from the stem of the valve, or the valve insides or core and which also does not interfere with the unseating of the valve in the stem for purposes of inflation, deflation, or the taking of pressure readings.

Another object is to provide a closure means for the upper ends of a valve stem which is arranged within the stem itself and permits of the use of the conventional air chuck on the stem for purposes of inflation or deflation.

A further and more specific object is to provide a closure member for the upper end of a valve stem which floats interiorly of the stem, in combination with provision for preventing the accidental displacement of the member from the stem.

A further object is to provide a closure member for a valve stem, such as has been hereinbefore specified, and which can be readily positioned in or removed from the interior of the stem.

A still further object is to provide a closure member for a valve stem which is simple in construction and which can be readily and inexpensively manufactured.

Further and additional objects and advantages not hereinbefore specified will become apparent hereinafter during the following detailed description of the invention as used with different forms of valve stems and valves and which are illustrated in the accompanying drawing, wherein, Fig. 1 is a fragmentary illustration of a rubber valve stem employing the usual valve insides or core partly in elevation and partly in section, and shows the invention embodied therein.

The invention is applicable to valve stems employing the conventional forms of removable valve insides or cores or it can be used with valve stems of the type wherein the valve seats are formed in the stems as integral structural parts thereof.

Figure 1:
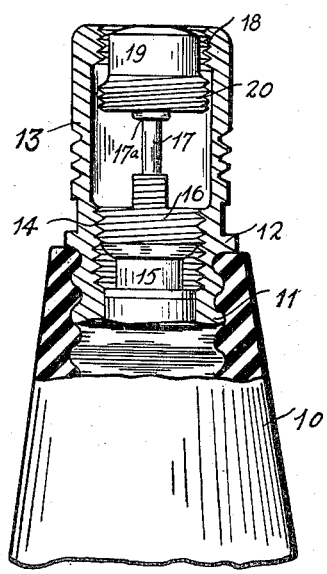
Figure 3:
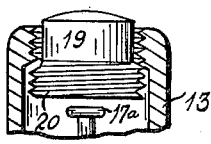
Fig. 3 is a fragmentary sectional view of the upper end of the valve stem shown in Fig. 1, with the closure member in a position such that its outer end can be grasped and the member rotated to remove the same from the stem.
Figure 2:
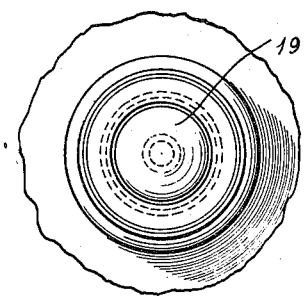
Fig. 2 is a top plan view of the valve stem shown in Fig. 1.

The valve stem shown in Figs. 1 to 3 is a rubber stem and it will be understood that the tubular rubber stem 10 is provided at its lower end with a base, by means of which the stem is attached to a tire tube or other inflatable article. The tubular rubber stem 10 has secured therein, as will be well understood, a metal insert 11 provided with a flange 12 engaging the upper end of the rubber stem 10 and having beyond said flange a nipple portion 13 projecting outwardly of the rubber stem 10. The metal insert has its interior bore formed to receive the usual valve insides or valve core, said bore being threaded, as indicated at 14, so that the barrel 15 of the valve insides which has at its lower end a valve seat can be forced into the stem and held in position therein by means of the threaded plug or swivel 16 connected to its upper end and screwed into the threaded portion 14 of the stem. The construction of the valve insides and the conformation of the bore in the insert are well understood in the art and need not be illustrated or described in detail herein.

It will be understood that the valve pin 17 extends through the threaded plug or swivel and the barrel of the valve insides or core and has fixed to its lower end the valve proper (not shown) which seats against the valve seat at the lower end of the barrel 15 of the insides or core. The valve proper is held seated by means of a suitable spring which can be located below the valve proper, or within the barrel, or between the swivel 16 and the head 17a of the pin, all of these enumerated locations of the valve spring being well understood in the art. The valve insides is so positioned in the stem and the valve pin 17 is of such length that its head 17a when the valve is seated is located inwardly of but adjacent to the outer end of the stem, as indicated in Fig. 1.

The upper end of the bore through the portion 13 of the insert is provided with several interior threads, as indicated at 18, for a purpose which will soon become apparent. The closure member forming the subject matter of the present invention is in the form of a cylindrical plug having a relatively long smooth unthreaded portion 19 of a diameter such as to closely fit in the open end of the portion 13 of the insert but have free sliding movement therein. The closure member below the portion 19 has a relatively short threaded portion 20, the length of which is such that it can contain several threads, as for example, two or three threads.

The closure member is inserted into the open end of the metal insert of the stem by screwing the threaded portion 20 thereof past the several interior threads 18 at the outer end of the insert, and as soon as the threads of the portion 20 of the closure member have passed the interior threads 18 of the insert, said member will, in effect, float interiorly of the insert between the head 17a of the valve pin and the outer end of the insert. The closure member should be so proportioned as to length that when it has been positioned interiorly of the insert its lower end will engage with the head 17a of the valve pin, while its outer end will lie substantially flush with the outer end of the insert with the smooth portion 19 of the closure member substantially closing the open end of the insert as clearly indicated in Fig. 1.

It will be understood that due to the scale upon which the views of the drawing are drawn that a rather substantial clearance is shown between the circumference of the portion 19 of the closure member and the bore of the insert, but in actual practice the fit therebetween will be sufficiently close so that the closure member will exclude to a large degree the entrance of dirt and other foreign matter into the interior of the stem.

The closure member should also be of such length that when the upper thread on the portion 20 thereof is in a position to engage with the lowermost of the threads 18 of the insert, the portion 19 of the closure member will extend outwardly beyond the end of the insert, as shown in Fig. 3, and thus present sufficient surface to enable the closure member to be grasped and rotated to remove it from the interior of the insert or stem. It will be understood, of course, that the threads 18 in the insert and the threads on the portion 20 of the closure member prevent the accidental displacement of the closure member from within the stem.

An inspection of Fig. 1 will clearly indicate that when it is desired to depress the valve pin 17 of the valve insides or core to unseat the valve thereof, it is merely necessary to apply pressure to the outer end of the portion 19 of the closure member to depress said member, and, in turn, the valve pin 17 and thus open the valve, at which time air may pass into or out of the valve stem around the closure member.

It will also be understood that the valve spring of the valve insides or core and also the fluid pressure in the article, when pressure is released from the closure member, will reseat the valve of the valve insides or core, and that the engagement between the head 17a of the pin and the lower end of the closure member will cause said member to be moved to the position shown in Fig. 1 by the seating movement of the valve of the insides or core.

When the valve stem is used upon a motor vehicle wheel and the vehicle is operating, centrifugal force will tend to hold the closure member in engagement with the head 17a of the valve pin and with the threads on the portion 20 out of engagement with the threads 18 in the insert, wherefore any rotation of the closure member due to vibration or other causes will not cause the closure member to be accidentally displaced from the stem. When the wheel is not rotating and the stem is in a downwardly extending position, the closure member will assume the position shown in Fig. 3, at which time it is not subject to vibration or movements causing it to rotate and it cannot accidentally fall out of the stem because of the threaded portion 20 and the threads 18 but it can be readily grasped and rotated to unscrew it from the stem if desired.

Figure 4:
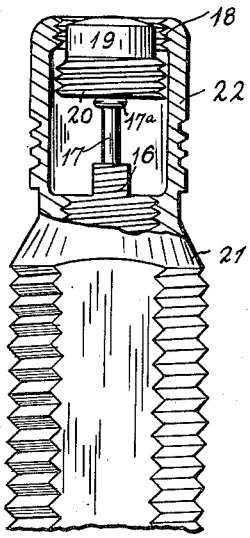
Fig. 4 is a view similar to Fig. 1, but showing the invention applied to a metal valve stem having therein the usual valve insides or core.

In Fig. 4 in place of a rubber valve stem a metal valve stem 21 has been indicated, but inasmuch as the structure of the closure member and the valve insides or core are identical, as in the instance of the rubber stem, said parts have been designated by the same reference characters, and it will be unnecessary to specifically describe the closure member in combination with the metal valve stem, it being sufficient to say that the reduced outer end 22 of the stem 21 corresponds to the portion 13 of the insert of the rubber stem.

Figure 5:
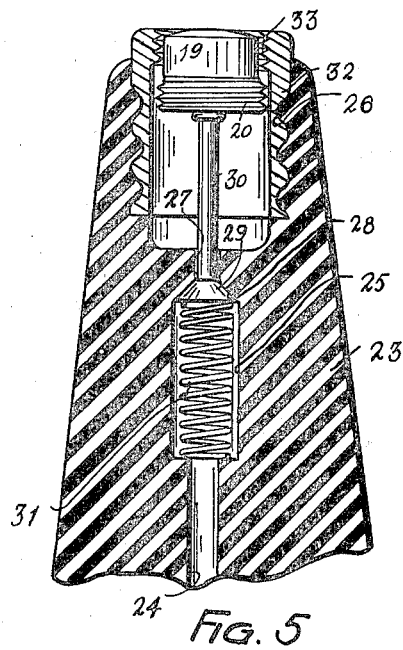
Fig. 5 is a sectional view of a rubber stem of the type having an integral valve seat formed in the bore of the stem, and showing the invention embodied therein.

The invention is shown applied in Fig. 5 to a valve stem of the type in which an integral valve seat is formed in the bore of the stem. The stem shown in Fig. 5 comprises a tubular stem portion 23, on the lower end of which is an integral base portion not shown but well understood in the art. The base and stem are molded from rubber into one integral structure, and the stem is provided with a bore 24 extending from its lower end outwardly in the stem to an enlarged bore 25. The outer end of the stem is provided with a counterbore 26 and said counterbore is in communication with the enlarged bore 25 by means of a restricted passage 27 formed by an inwardly extending portion of the stem at the inner end of the counterbore 26 and constituting a tapered valve seat and indicated at 28 in Fig. 5. A valve 29 is located in the enlarged bore 25 and is provided with a pin 30 extending through the restricted passage 27 and into the counterbore 26. A coil spring 31 is mounted in the enlarged bore 25 and abuts the lower end thereof and the underside of the valve 29 and acts to normally maintain said valve seated against the seat 28. A short metal insert 32 is molded in the counterbore 26 and has a portion projecting slightly beyond the outer end of the stem. This latter portion of the insert 32 is provided with several interior threads 33 corresponding to the threads 18 previously referred to in the description of Figs. 1 to 4 inclusive. A closure member identical with the closure members previously described is mounted in the open end of the insert 32 being positioned therein by screwing the threaded portion 20 past the threads 33, after which said closure member floats in the outer end of the insert between the head at the outer end of the valve pin 30 and the outer end of the insert, said closure member having a sliding fit in the open end of the latter.

It will be understood that the operation and function of the closure member, as described with respect to the type of stem shown in Fig. 5, is identical with the operation and function of the closure members previously described. It will also be understood that the valve 29 and the spring 31 can be assembled in the stem by pushing the same through the restricted opening 27, since the valve seat 28 being formed of rubber can be distorted sufficiently to permit of the assembly of the valve and spring in the stem. Of course other forms of valve stems of the type wherein the valve seat is formed integrally in the bore of the stem could just as well be employed in combination with the closure member embodying the invention.

It will be seen that a closure member embodying the present invention is extremely simple in construction and very economical, inasmuch as it does not require the use of additional springs or similar elements nor the complete exterior threading of the outer end of the metal insert in the case of the rubber stem or of the reduced nipple at the outer end of the metal stem, which are necessary when the closure member is carried by caps that are screwed exteriorly upon the stems. Of course, if desired, the outer end of the insert or of the reduced nipple might be threaded so the usual form of valve cap could be applied thereto. It will likewise be seen that the closure member can be readily positioned within or removed from the stem, and will not be accidentally displaced therefrom. Also the closure member while substantially closing the outer end of the stem will not increase the length of the stem as would the usual valve cap. Since the closure member floats and has a sliding fit in the end of the stem, its movement therein will tend to free it of dirt, mud and other matter.

It will be appreciated that in providing a closure member for the outer open end of a valve stem and which is located in the stem itself, provision must be made to permit of the insertion in or removal from the stem of the valve or valve insides or core. The closure member of the present invention fully takes care of this condition since it can be so readily positioned in the stem after the valve or valve insides or core have been assembled therein and, conversely, removed before disassembling the valve or valve insides from the stem.

The conventional or standard forms of air chucks now in use employ pins engageable with the valve pins to unseat the valves in the stems and these pins of the chucks must extend a certain distance into the open end of the valve stems before the chuck valves are properly unseated and before the valve pins are depressed the necessary distance. The chuck pins are of such diameter that the diameter of the bore at the open outer end of the valve stems cannot be restricted if the standard forms of air chuck are to be used upon the valve stems. It will be noted that the closure member of the present invention does not restrict the diameter of the bore at the outer end of the stem so as to prevent a chuck pin properly extending into the stem the necessary amount. Hence standard forms of air chucks can be applied to valve stems embodying the present invention.

Although an embodiment of the invention has been illustrated and described in detail herein, as employed in different types of valve stems, it should be understood that the invention is susceptible of various modifications and adaptations within the scope of the appended claims.

Having thus described my invention I claim:

1. In combination with a valve stem provided at its outer end with several interior threads and having a valve seat therein, a valve cooperating with said seat and a valve pin extending toward the outer end of said stem for unseating said valve; closure means for the open outer end of said stem in the form of a plug floating within the stem outwardly of the outer end of said valve pin, said plug having a smooth cylindrical portion of a diameter such as to have a working sliding fit in the open outer end of the stem and substantially closing said end and a threaded portion located inwardly of said cylindrical portion, said plug being adapted to be inserted in or removed from the stem by screwing the threaded portion thereof past the interior threads at the outer end of the stem, said interior threads at the outer end of the stem and said threaded portion of the plug preventing accidental displacement of the closure means from the stem.

2. In combination with a valve stem provided at its outer open end with several interior threads and having a valve seat therein, a valve cooperating with said seat and a valve pin extending toward the outer end of the stem for unseating said valve, closure means for the outer open end of said stem and in the form of a plug floating in said stem outwardly of the outer end of said valve pin, said plug having a relatively long, smooth, cylindrical portion and a relatively short threaded portion, the length of said cylindrical portion being such that when the outermost thread of the threaded portion is in a position to engage the innermost interior thread in the outer end of the valve stem said cylindrical portion will project outwardly of the stem and provide means which will enable said plug to be grasped and rotated whereby said plug can be screwed past the interior threads of the stem to position the plug in or remove the same from the interior of the stem while said threaded portion prevents the accidental displacement of the plug from the stem.

3. In combination with a valve stem provided with a bore having several interior threads at the outer end of the stem and a smooth portion inwardly of said threads, a valve seat in said stem, a valve cooperating with said seat and a valve pin for unseating said valve and extending toward the outer end of the stem, a closure means for the outer open end of said stem in the form of a plug floating within the stem outwardly of the outer end of said valve pin, said plug having a smooth cylindrical portion of a diameter such as to have a working sliding fit in the open outer end of the stem and substantially closing said end, and a relatively short threaded portion inwardly of said cylindrical portion and normally located in the smooth portion of the valve stem bore, said plug being adapted to be inserted in and removed from the stem by screwing the threaded portion thereof past the interior threads at the outer end of the stem, said interior threads at the outer end of the valve stem and said threaded portion of the plug preventing accidental displacement of the closure means from the stem.

4. In combination with a rubber valve stem having a tubular metal insert secured therein at its outer end and projecting outwardly of said end and provided with several interior threads at its outer end, a valve seat in said stem, a valve cooperating therewith, and a valve pin for unseating said valve and extending into said insert toward the outer end thereof; a closure means for the outer open end of said insert in the form of a plug floating within the insert outwardly of the outer end of said valve pin, said plug having a smooth cylindrical portion of a diameter such as to have a working sliding fit in the open outer end of the insert and substantially closing said end, and a relatively short threaded portion located inwardly of said cylindrical portion, said plug being adapted to be inserted in or removed from the stem by screwing the threaded portion thereof past the interior threads at the outer end of the insert, said interior threads at the outer end of the insert and said threaded portion of the plug preventing accidental displacement of the closure means from the stem.

JOHN C. CROWLEY.